Dec. 19, 1967

J. SLETBAK ET AL 3,359,482

FREQUENCY CHANGER WITH A PLURALITY OF TRANSFORMERS
AND A SYNCHRONOUSLY ROTATING MEANS

Filed May 21, 1965

INVENTORS
JARLE SLETBAK
GUNNAR NILSSON
LARS-GORAN VIRSBERG

BY

ATTORNEYS

United States Patent Office 3,359,482
Patented Dec. 19, 1967

3,359,482
FREQUENCY CHANGER WITH A PLURALITY OF TRANSFORMERS AND A SYNCHRONOUSLY ROTATING MEANS
Jarle Sletbak, Trondheim, Norway, and Gunnar Nilsson, Tillberga, and Lars-Goran Virsberg, Vasteras, Sweden, assignors to Allmänna Svenska Elektriska Aktiebolaget, Vasteras, Sweden, a corporation of Sweden
Filed May 21, 1965, Ser. No. 457,748
Claims priority, application Sweden, June 4, 1964, 6,781/64
8 Claims. (Cl. 321—70)

ABSTRACT OF THE DISCLOSURE

A device for transforming a first alternating voltage of a certain frequency to a second alternating voltage with a lower frequency has a transformer, the primary winding of which is connected to one fixed and one movable contact on a second transformer. The fixed contact is connected to the middle of a winding of the second transformer. The movable contact is movable along the winding with a sine-shaped movement. The secondary winding of the first transformer is connected to a capacitive load intermittently and periodically with a frequency which is synchronous to the frequency of the first voltage.

---

Figure 1:
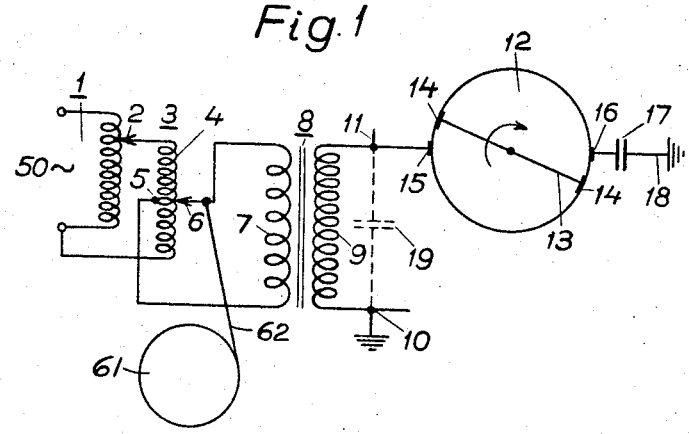

Testing of electrical insulation strength is often carried out with alternating voltage of power frequency, usually 50 or 60 cycles per second. Such testing comprises standard testing control as well as manufacturing and running maintenance control.

In such testing of objects with large capacitance, such as machine windings, cables, capacitors, etc., the necessary testing power attains values of several hundred kva. Testing equipment for these powers is necessarily both heavy and bulky and also expensive. There is therefore a need for other testing methods with lighter and cheaper testing equipment, but which nevertheless gives substantially the same information as to insulation strength as the testing with power frequency mentioned in the introduction.

In order to simplify and in certain cases make possible the testing of objects with large capacitance, direct current tests have been used to a certain extent. This testing procedure has a lighter testing equipment but the voltage distribution in the insulation differs from that with alternating voltage tests. The insulation is usually built up of layers of different materials with different dielectric constants $\epsilon$ and resistivity $\rho$. In alternating voltage tests the voltage distribution in the insulation will be determined by $\epsilon$ for the different materials, while in direct voltage tests on the other hand the voltage distribution is determined by the resistivity $\rho$ of the different layers. This may thus result in quite different voltage distributions in testing with alternating voltage and direct voltage. In testing of winding coils for high voltage machines testing with direct current may in addition under certain conditions result in disproportionally high strain on the coil ends compared with alternating voltage tests.

In order to avoid the disadvantages now mentioned in testing with alternating voltage of power frequency and with direct voltage, it has been proposed to carry out tests with alternating voltage of low frequency. In order to reduce the effect requirement as much as possible the frequency should be chosen low, however not lower than that with which substantially the same voltage distribution is obtained as in testing with power frequency. Examinations carried out show that these demands are fulfilled if a frequency of the order of 0.1 cycle per scond is used. Since frequency is then 1/500 of the frequency in testing with 50-cycle alternating voltage, the necessary testing power is reduced to about the same extent and amounts for example in a large power generator to a few kva.

The present invention relates to a means for changing a first alternating voltage with a certain frequency to a second alternating voltage with lower frequency. The invention is characterized in that it comprises partly a transformer and means for reversal of polarity and for periodic variation of the voltage fed to the transformer and partly a device which, synchronously with the frequency of the first alternating voltage, intermittently and periodically connects the transformer to a capacitive load, across which the second alternating voltage is then produced.

Figure 2:
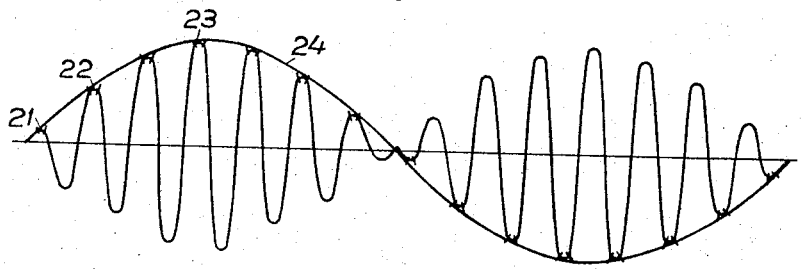

On the accompanying drawing FIG. 1 shows schematically a suitable embodiment of the invention, while FIG. 2 shows how the low frequency voltage is delivered from the high frequency.

Figure 3:
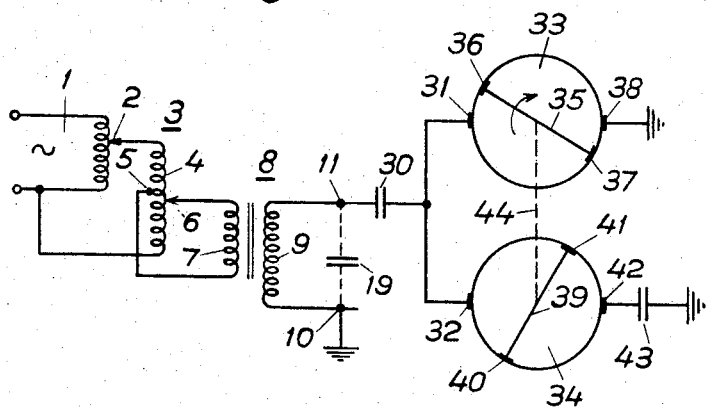
Figure 4:
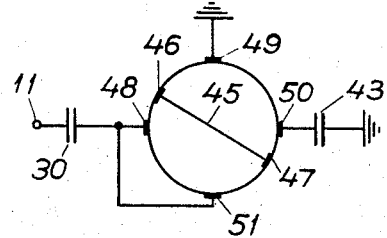

FIG. 3 and FIG. 4 show two devices for doubling the low frequency voltage.

A voltage adjustment device 1 is connected to an alternating current network with a frequency of 50 cycles/sec. Between its movable contact 2 and one pole terminal of the network, the winding 4 of an adjustable transformer 3 is situated. The voltage across the winding 4 can thus be adjusted by means of said contact 2. The adjustable transformer has a permanent output 5 at the centre of the winding and a movable contact 6, which can be moved along the winding. The contact 6 is operated here with such a movement that the voltage received between the permanent output 5 and the contact 6 becomes sine-shaped and has its zero value when the contact 6 is just opposite the output 5. This voltage is fed to the low voltage winding 7 of a transformer 8. The high voltage winding 9 is earthed at one of its ends 10.

A rotatable device which is shown here as a circular disc 12 of insulating material supports a conducting connection 13 arranged diametrically of the disc. On the periphery of the disc two conducting contact segments 14 are arranged. These are placed diametrically opposite each other and are connected to the conducting connection 13. Outside the disc two permanent slip contacts 15 and 16 are arranged which slip against the periphery of the disc. The slip contact 15 is connected to the unearthed end 11 of the high voltage winding 9. The slip contact 16 is connected to a load which here is shown as a capacitor 17. The capacitor is earthed at 18.

The operation of the device will now be further explained by means of FIG. 2, which shows how a period of the low frequency voltage is generated. If this voltage is to have the frequency 0.1 cycle per second, the time of one cycle will be 10 seconds, which corresponds to 500 cycles of the 50-cycle voltage. In order to obtain a clearer figure, a considerably fewer number of periods of the 50-cycle voltage have been shown.

The disc 12 rotates synchronously with the high frequency voltage and, since it has a single diametrical connection, it will rotate at 1500 turns/minute. When the high frequency voltage goes through zero the connection between the slip contacts 15 and 16 will be broken and the output voltage of the adjustable transformer will be zero and the movable contact 6 will thus be situated in its centre position. The contact 6 is operated with a sine-shaped varying movement, so that it is situated at its highest position after 2.5 seconds, after which it turns and is again in its centre position after a further 2.5 seconds.

Said movable contact 6 may be operated in any known manner, for example by a rotatable disc 61 and a link 62 connecting said disc 61 and movable contact 6. The rate of rotation of the disc will determine the frequency of the low frequency voltage. The discs 12 and 61 may be connected by a gear or may be driven separately by synchronous motors.

After a quarter of a period of the high frequency voltage, this has an amplitude which is shown at 21. At that moment the connection 13 is horizontal and closes the connection between the winding 9 and the capacitor 17, so that this is charged to the momentary peak value of the high frequency voltage. After a further period of the high frequency voltage, this peak value is 22 and during said time the disc has turned a half turn so that the connection is again established between the transformer 8 and the capacitor 17 and the capacitor is charged up to the value 22. After 2.5 seconds the contact 6 is at its highest position and then the capacitor is charged up to the highest peak value 23 of the high frequency voltage. After this the contact 6 begins a downward movement and a lower and lower voltage is fed to the transformer 8, so that the value of the charging voltage to the capacitor also sinks. After a further 2.5 seconds the contact 6 is in its centre position, so that the voltage across the transformer 8 and across the capacitor is zero.

The contact 6 continues its downward movement, which causes the voltage across the low voltage winding of the transformer to be inverted in phase by 180°. The movable contact 6 and the permanent centre output 5 thus effect a pole changing when they pass each other. The right-hand part of the curve in FIG. 2 consequently becomes an image of the left-hand part. Since the rotation of the rotatable means 12 is not influenced by the pole reversal during the next 5 seconds, the high voltage winding of the transformer will be connected to the capacitor when the high frequency voltage has its negative maximum value and the charge of the capacitor changes its polarity.

A positive half cycle of the voltage across the capacitor is thus built up during 250 cycles of positive voltage peaks of the 50-cycle voltage. After this the polarity changes and during the following 250 cycles the negative half period of the voltage is formed of 250 negative voltage peaks. The voltage across the capacitor consequently has the appearance which the envelope 24 drawn with an unbroken line shows, i.e. an alternating voltage with the frequency 0.1 cycle per second and the same instantaneous value as the 50-cycle voltage. Because the capacitor receives its charging impulses when the high frequency voltage has its peak value, the closing time between the contacts 14, 15 and 16 is made relatively long and there is usually a sufficient quantity of energy to be fed to the capacitor. If this is not the case, a capacitor 19 can be connected in parallel across the primary winding 9.

Such an arrangement of voltage regulation, voltage variation and pole reversal is only to be regarded as an example of how these details can be made and many other solutions are feasible. In a similar way the rotatable device can be exchanged for controlled mechanical contacts, controlled electronic means or similar devices for connecting the transformer to the load.

It is also possible to allow the capacitor to be charged up by each half cycle of the high frequency voltage by modifying the rotatable device 12 so that the capacitor is connected four times per rotation. The rotatable device will then operate as a commutator.

The device can besides be constructed so that it is possible to change three-phase high frequency voltage to one-phase low frequency voltage by using a three-phase transformer and completing the rotatable device with two further contact sets and conducting connections, which are mutually displaced 120°.

The frequency changer according to the invention can also be completed with a frequency doubler known per se. FIG. 3 shows such a device. The high voltage winding 9 of the transformer 8 is connected at its unearthed end to a series capacitor 30, which is connected to two fixed contacts 31 and 32 arranged to cooperate with two similar rotatable devices 33 and 34. The rotatable device 33 has a diametrical conducting connection 35 with two conducting contact segments 36 and 37. Opposite the fixed contact 31 there is another fixed contact 38, which is connected to earth.

In a similar way the rotatable device 34 is provided with a conducting connection 39 with two contact segments 40 and 41 and further a fixed contact 42, which is connected across a capacitor 4311 to earth. The two conducting connections are mechanically connected together with a shaft 44 or the like, so that they are driven synchronously, but they are arranged at right angles to each other.

When the conducting device 35 is in a horizontal position, the capacitor 30 is connected to earth over the contacts 31 and 36, the connection 35 and the contacts 37 and 38. The capacitor is thereby charged to the potential of the point 11. After a half cycle of the high frequency voltage, the point 11 has the opposite polarity. The connection 35 is then in the upright position, while the connection 39 is horizontal and connects the capacitor 30 to the capacitor 43. The capacitor 43 will then be charged to a voltage which is twice as high as the voltage of the capacitor 30, since the voltage across the winding 9 is added to the voltage of the capacitor 30. Across the capacitor 43 there will thus be a low frequency voltage with a peak value of substantially twice the value of the voltage across the winding 9.

FIG. 4 shows a simplification of the device according to FIG. 3. Here a single rotatable device 45 with two conducting contact segments 46 and 47 is used and four fixed contacts 48, 49, 50 and 51 arranged symmetrically round the rotatable device. The contacts 48 and 51 are connected with each other and with the capacitor 30, while the contact 49 is connected to earth and the contact 50 is connected to the capacitor 43.

When the connection 45 is in a vertical position, the capacitor 30 is charged to the voltage of the winding 9. After a half cycle of the high frequency voltage, the connection 45 will be in a horizontal position and the capacitor 43 is charged with a voltage which is approximately twice the voltage across the capacitor 30 in the same way as has been explained in connection with FIG. 3.

With similar devices it is at least theoretically possible to raise the voltage further across the load capacitor 43 and the devices now shown are only to be regarded as an example of how they could be formed.

We claim:

1. A device for transforming a first alternating voltage of a certain frequency to a second alternating voltage with a lower frequency, comprising a transformer, a source of said first alternating voltage, means connecting said transformer to said source, means in said connecting means for reversing the polarity of and for periodic variation of the voltage fed to the transformer, a capacitive load, and means operating synchronously with the frequency of said first alternating voltage for intermittently and periodically connecting the transformer with said capacitive load, whereby the second alternating voltage arises across said load, said means for reversing the polarity and for periodic variation of the voltage fed to the transformer being a second transformer, one winding of which has a contact fixed to the middle of said winding and a movable contact and means connecting the low voltage winding of the first transformer between said two contacts.

2. A device according to claim 1, said means for reversing the polarity and for periodic variation of the voltage fed to the transformer including means to move said movable contact to produce a voltage between said fixed and said movable contacts whose amplitude continually varies in a sine-shape from zero to a maximum value and back again to zero.

3. A device according to claim 1, in which the means for reversing the polarity becomes active each time the voltage between said fixed and said movable contacts of said second transformer is zero.

4. A device according to claim 1, in which the high voltage winding of the first transformer is earthed at one end and said means for intermittently and periodically connecting the first transformer to the capacitive load connects the other end of the transformer with said capacitive load.

5. A device according to claim 4, in which the means which connects the high voltage winding of the first transformer with the capacitive load comprises a rotatable device, and means to rotate said device synchronously with the frequency of the first alternating voltage, said connecting means making said connection at least once per cycle of the first alternating voltage.

6. A device according to claim 5, in which said rotatable device comprises a circular disc of insulating material provided with a conducting connection extending diametrically thereacross and with two diametrically positioned conducting contact segments arranged on the periphery of the disc which are connected with each other by said conducting connection, two fixed sliding contacts arranged outside the disc diametrically opposite each other to be engaged by said contact segments on the disc at the same time, and one of said fixed contacts being connected to the secondary winding of the transformer, while the second fixed contact is connected to the capacitive load.

7. A device according to claim 4, in which said rotatable device comprises two conducting connections which are driven synchronously with each other and are arranged at right angles to each other, a series capacitor between the high voltage winding and the rotatable device, and said rotatable device including means to connect said series capacitor once during every other half cycle of the high frequency voltage to earth and once during the alternate half cycles of the same voltage to the capacitive load.

8. A device according to claim 4, having a series capacitor between the high voltage winding and the rotatable device, said device comprising a rotatable conducting connection, said connection once during every other half cycle of the high frequency voltage connecting said series capacitor to earth and once during the alternate half cycles connecting said capacitor to the capacitive load.

References Cited

UNITED STATES PATENTS

| | | | |
|---|---|---|---|
| 2,038,960 | 4/1936 | Schattanik | 321—50 X |
| 2,979,651 | 4/1961 | Martin | 321—70 |

JOHN F. COUCH, *Primary Examiner.*

G. GOLDBERG, *Assistant Examiner.*